(12) United States Patent
Demeyer

(10) Patent No.: US 9,015,696 B2
(45) Date of Patent: Apr. 21, 2015

(54) SYSTEM AND METHOD FOR LICENSING SOFTWARE

(75) Inventor: Michael Demeyer, Danville, CA (US)

(73) Assignee: Cyberlink Corp., Shindian, Taipei (TW)

( * ) Notice: Subject to any disclaimer, the term of this patent is extended or adjusted under 35 U.S.C. 154(b) by 191 days.

(21) Appl. No.: 13/611,762

(22) Filed: Sep. 12, 2012

(65) Prior Publication Data

US 2013/0006852 A1 Jan. 3, 2013

Related U.S. Application Data

(62) Division of application No. 10/678,882, filed on Oct. 3, 2003, now Pat. No. 8,898,657.

(51) Int. Cl.
*G06F 9/44* (2006.01)
*G06F 21/10* (2013.01)

(52) U.S. Cl.
CPC .................................... *G06F 21/10* (2013.01)

(58) Field of Classification Search
USPC .......................................................... 717/172
IPC ........................................................ G06F 21/10
See application file for complete search history.

(56) References Cited

U.S. PATENT DOCUMENTS

| | | | |
|---|---|---|---|
| 4,937,863 A | 6/1990 | Robert et al. | |
| 5,138,712 A | 8/1992 | Corbin | |
| 5,204,897 A * | 4/1993 | Wyman | 710/200 |
| 5,375,206 A | 12/1994 | Hunter et al. | |
| 5,386,369 A | 1/1995 | Christiano | |
| 5,412,575 A * | 5/1995 | Constant et al. | 705/400 |
| 5,473,692 A | 12/1995 | Davis | |
| 5,564,038 A | 10/1996 | Grantz et al. | |
| 5,568,552 A | 10/1996 | Davis | |
| 5,579,479 A | 11/1996 | Plum | |
| 5,636,277 A | 6/1997 | Nagahama | |
| 5,671,412 A | 9/1997 | Christiano | |
| 5,742,757 A | 4/1998 | Hamadani et al. | |
| 5,758,068 A | 5/1998 | Brandt et al. | |
| 5,771,347 A | 6/1998 | Grantz et al. | |
| 5,796,941 A | 8/1998 | Lita | |
| 5,925,127 A * | 7/1999 | Ahmad | 726/31 |
| 6,023,766 A | 2/2000 | Yamamura | |
| 6,029,145 A | 2/2000 | Barritz et al. | |
| 6,049,789 A * | 4/2000 | Frison et al. | 705/59 |
| 6,056,786 A | 5/2000 | Rivera et al. | |

(Continued)

OTHER PUBLICATIONS

Succi et al., "Supporting Electronic Commerce of Software Products through Pay-per-Use Rental of Downloadable Tools", 2001, University of Calgary.*

*Primary Examiner* — Anna Deng
*Assistant Examiner* — Junchun Wu
(74) *Attorney, Agent, or Firm* — McClure, Qualey & Rodack, LLP

(57) ABSTRACT

A system and method for licensing software using a clearinghouse to license only the technology modules that an end user registers. The clearinghouse maintains registration information which can be used to bill a software provider for the technology licensed to the end user. The system can be used to compensate technology owners only after the end user registers an unlicensed technology module. Thus, the system and method allows software vendors to reduce costs by licensing only the technologies that an end user actually uses. The clearinghouse can also be used to track the usage of software functionality to determine the popularity of a particular technology.

7 Claims, 14 Drawing Sheets

(56) References Cited

U.S. PATENT DOCUMENTS

| | | | |
|---|---|---|---|
| 6,173,446 B1 | 1/2001 | Khan et al. | |
| 6,189,146 B1 | 2/2001 | Misra et al. | |
| 6,195,091 B1 * | 2/2001 | Harple et al. | 715/751 |
| 6,233,567 B1 | 5/2001 | Cohen | |
| 6,260,141 B1 | 7/2001 | Park | |
| 6,324,649 B1 | 11/2001 | Eyres et al. | |
| 6,343,280 B2 | 1/2002 | Clark | |
| 6,385,726 B1 | 5/2002 | Hasebe et al. | |
| 6,411,941 B1 | 6/2002 | Mullor et al. | |
| 6,615,191 B1 | 9/2003 | Seeley | |
| 6,615,359 B2 | 9/2003 | Eyres et al. | |
| 6,826,546 B1 | 11/2004 | Shuster | |
| 6,941,353 B1 | 9/2005 | Lane | |
| 7,278,164 B2 * | 10/2007 | Raiz et al. | 726/26 |
| 7,565,531 B2 * | 7/2009 | Yu et al. | 713/161 |
| 7,822,621 B1 * | 10/2010 | Chappel | 705/2 |
| 7,983,988 B2 * | 7/2011 | Bouriant et al. | 705/59 |
| 8,060,751 B2 * | 11/2011 | Kitaj et al. | 713/182 |
| 2001/0011254 A1 | 8/2001 | Clark | |
| 2001/0013099 A1 | 8/2001 | Haruki | |
| 2002/0016774 A1 * | 2/2002 | Pendlebury | 705/51 |
| 2002/0035693 A1 | 3/2002 | Eyres et al. | |
| 2002/0082717 A1 | 6/2002 | Hellberg | |
| 2002/0091644 A1 | 7/2002 | Wong et al. | |
| 2002/0091645 A1 | 7/2002 | Tohyama | |
| 2002/0107701 A1 * | 8/2002 | Batty et al. | 705/1 |
| 2002/0116339 A1 | 8/2002 | Lin | |
| 2002/0120578 A1 | 8/2002 | Sy | |
| 2002/0120726 A1 | 8/2002 | Padole et al. | |
| 2002/0128842 A1 | 9/2002 | Hoi et al. | |
| 2002/0128856 A1 * | 9/2002 | Stefik et al. | 705/1 |
| 2002/0138441 A1 | 9/2002 | Lopatic | |
| 2002/0152405 A1 | 10/2002 | Colvin | |
| 2002/0161717 A1 | 10/2002 | Kassan et al. | |
| 2002/0161930 A1 | 10/2002 | Vardi et al. | |
| 2002/0169625 A1 | 11/2002 | Yang et al. | |
| 2002/0169700 A1 * | 11/2002 | Huffman et al. | 705/35 |
| 2002/0174356 A1 | 11/2002 | Padole et al. | |
| 2003/0028786 A1 | 2/2003 | Mustafa | |
| 2003/0061136 A1 | 3/2003 | Inoue | |
| 2003/0083998 A1 * | 5/2003 | Ramachandran et al. | 705/59 |
| 2003/0088516 A1 | 5/2003 | Remer et al. | |
| 2003/0126456 A1 | 7/2003 | Birzer et al. | |
| 2003/0149670 A1 | 8/2003 | Cronce | |
| 2003/0156719 A1 | 8/2003 | Cronce | |
| 2003/0182563 A1 | 9/2003 | Liu et al. | |
| 2003/0204736 A1 | 10/2003 | Garrison et al. | |
| 2003/0220883 A1 | 11/2003 | Block et al. | |
| 2004/0010440 A1 | 1/2004 | Lenard et al. | |
| 2004/0010469 A1 | 1/2004 | Lenard et al. | |
| 2004/0010471 A1 | 1/2004 | Lenard et al. | |
| 2004/0019565 A1 | 1/2004 | Goringe et al. | |
| 2004/0044630 A1 | 3/2004 | Walker et al. | |
| 2004/0045000 A1 | 3/2004 | Hara | |
| 2004/0068734 A1 | 4/2004 | Bond et al. | |
| 2004/0073789 A1 | 4/2004 | Powers | |
| 2004/0098348 A1 | 5/2004 | Kawasaki et al. | |
| 2004/0143746 A1 | 7/2004 | Ligeti et al. | |
| 2004/0153416 A1 | 8/2004 | Fujimoto | |
| 2004/0153658 A1 | 8/2004 | Gunyakti et al. | |
| 2004/0167859 A1 | 8/2004 | Mirabella | |
| 2005/0240938 A1 * | 10/2005 | Lane | 719/310 |

* cited by examiner

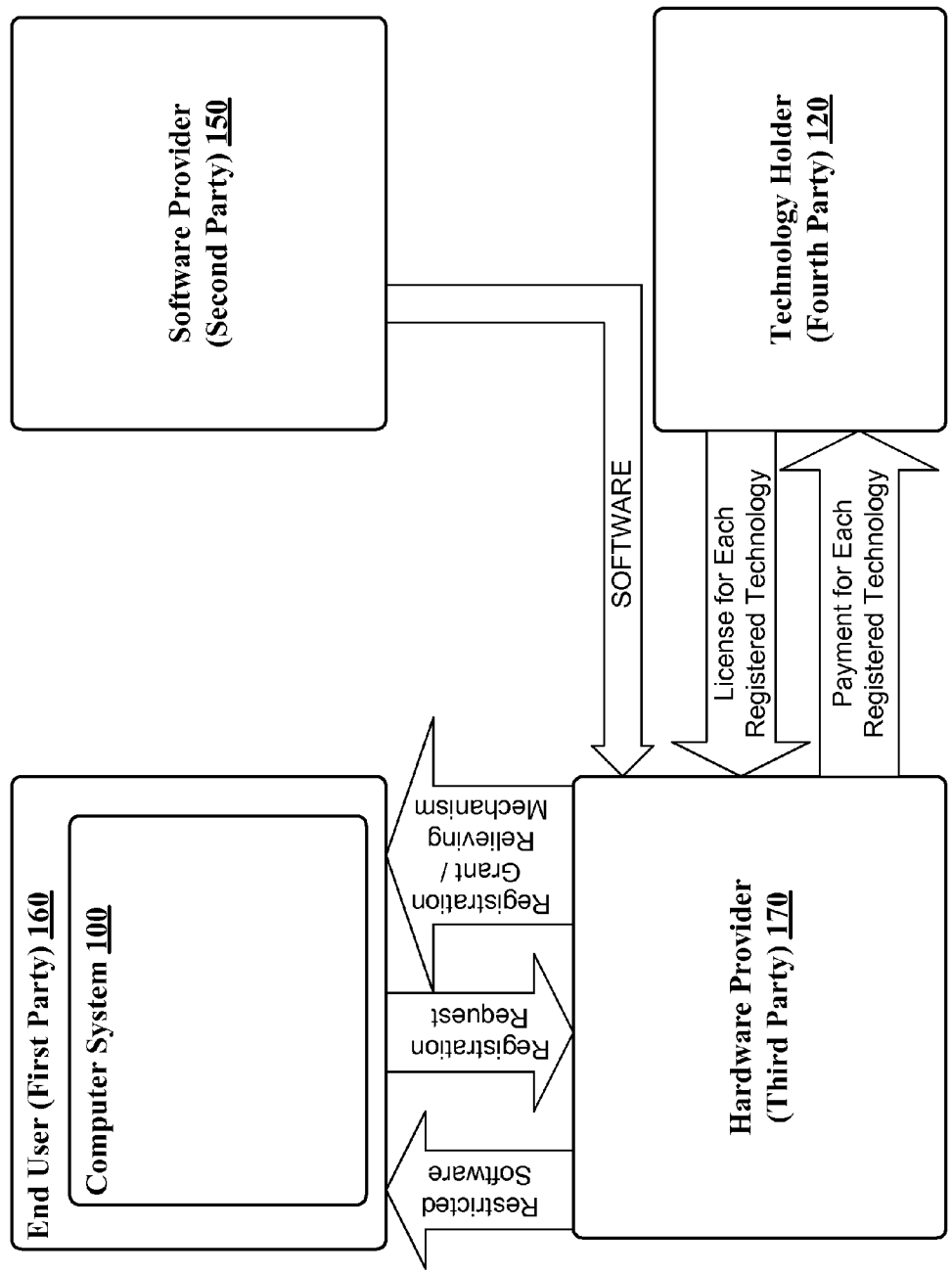

SYSTEM AND METHOD FOR LICENSING SOFTWARE

The present application is a divisional of U.S. patent application Ser. No. 10/678,882, filed Oct. 3, 2003, the disclosure of which is incorporated herein by reference.

TECHNICAL FIELD OF THE INVENTION

The present invention generally relates to a system and method for licensing software, and more particularly relates to a system for licensing specific technology modules within a software product on an as-needed basis and a method for the same.

BACKGROUND OF THE INVENTION

Personal computers are often sold with bundled software packages that are preinstalled on the computer. Similarly, peripherals for computers are sold with bundled software packages made available on an enclosed media such as a DVD, CD-ROM, floppy disk, or other known portable medium. Alternatively, software used with personal computers and computer peripherals may be downloaded from a remote server over a network. These software packages typically provide functionality to be used by the end user with the purchased computer or peripheral device. For example, a DVD optical drive may be bundled with software used to play or record DVD movies or data. Similarly, an optical scanner may be sold with bundled software for capturing and viewing a scanned image, manipulating images, providing optical-character recognition (OCR), or software to enable a scanner and printer shared by the same personal computer to be used as a photocopier. Likewise, a personal computer may be sold with preinstalled anti-virus software, software tools for viewing digital photographs, video editing software, or operating system software.

These bundled software products often include features that incorporate portions of executable software that require the payment of royalties to technology holders. The technologies used in a single software product may be developed and licensed from one or more technology holders. A software provider typically licenses the intellectual property rights from each of the technology owners before selling the product to the end user. A license typically covers each copy of the software sold. This licensing cost is incorporated into the cost of the software product and passed on to the end user. In the case of playback software used to play commercially produced DVD movies, this software generally involves considerable per-unit licensing fees associated with licensed technologies that are required for playback of certain content. The costs of these licenses are passed on to the end user in the purchase price of the playback software or hardware that bundles the software. An example of such a licensed feature is Dolby® Digital audio decoding, provided by Dolby Laboratories. Specifically, a license to the Dolby Digital technology is required within DVD playback software used to decode a DVD movie incorporating this audio technology.

However, the actual percentage of end users who playback DVDs requiring the Dolby technology is less than 100% because some users only play personal content, while others may use the DVD drive only for data storage or other computing purposes. Further, some users may not use their DVD drive at all. In the case of Dolby Digital audio cited above, this technology is required for playback of commercial DVD discs using this technology. However, the decoding technology is not needed to view the large library of DVD movies which do not use Dolby Digital technology. For these users, the license fees associated with the technologies are wasted.

Prior art licensing systems, as shown in FIG. 1A, provide for an interaction between an end user 10 and a software provider 20. In a first instance, the software provider 20 directly provides a software product to the end user 10 in exchange for compensation from the end user 10. In this case, the licensing fees for technologies such as Dolby Digital may be paid to the technology holders 30 by the software provider 20 for each copy of software sold, without regard to the actual use of the licensed technologies by the end user 10. In return, technology holder 30 provides a technology license for each copy of software sold by software provider 20.

In the context of bundled DVD player software, the prior art system shown in FIG. 1B provides for licensing bundled software between an end user 10, hardware provider 40, a software provider 20, and a technology holder 30. A software provider 20 provides a license for a software product with unlimited functionality to a hardware provider 40 in exchange for compensation. The end user 10 is provided the software product 12 as bundled software included with a computer or computer peripheral supplied by the computer or hardware provider 40. Under the current state of the art, the licensing fees for technologies such as Dolby Digital are paid to the technology holders 40 by the software provider 20 (and/or the hardware provider 40) without regard to the actual use of the licensed technologies by the end user 10. Thus, because usage of the specific features within a software product are not typically tracked, a license to a particular technology is required for each software product 12 sold containing the technology. Therefore, there is a discrepancy between the cost of the technology license (by the hardware or software provider 20) and the actual need (by the end user 10), which is disadvantageous for both the end user 10 and software provider 20. For end user 10, the money for the license is wasted if the technology is not used. For the software provider 20, the high cost of license fees will either reduce profit margins or be passed on to the end user 10 in the selling price, which can inhibit market share.

Accordingly, a need exists in the industry for a system and method of licensing software that addresses the aforementioned deficiencies and inadequacies.

SUMMARY OF THE INVENTION

The present invention is broadly directed to a novel system and method that, in response to a request or activation of software by an end user, triggers a financial payment or accounting between two other enterprises (such as between a hardware provider and a software provider, or between a software provider and a technology holder, or between a hardware provider and a technology holder, etc.)

In accordance with one embodiment of the present invention, a method is provided for licensing software on a computer hardware platform. The software includes at least one function that is restricted to a limited use. The method includes the step of transmitting an activation request to a registration clearinghouse in order to activate a technology that must be registered to use the function. The method also includes causing registration information related to the technology to be compiled in a registration database within the registration clearinghouse. The method also includes receiving a communication that is capable of relieving the limited use restriction of the function. Finally, actual usage of the technology is determined based on the registration information compiled in the registration database.

According to a further enhancement of the above process, a software developer may pay the owner of a technology based on the registration information compiled in the registration database.

Accordingly, one object of the present invention is to reduce costs to a company offering bundled software (e.g. a personal computer or DVD drive manufacturer) by only paying technology license fees for copies of software that actually use the technology.

Another object of the present invention is to compensate technology holders for each copy of the software that actually uses their technologies, and to provide a clear understanding and documentation of the value of the technology in the marketplace.

Another object of the present invention is to lower prices for the end user, who benefits from the reduced costs to the company providing the bundled software while allowing convenient access to all technologies required to meet their needs.

Another object of the present invention is to allow a software provider to deliver more value to the companies offering bundled software, and to provide expanded opportunities for direct interaction with the end user.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2E is a diagram of one embodiment of a software licensing system in which a third party provides a payment to a fourth party based on registration information recorded by the third party;

DETAILED DESCRIPTION OF THE PREFERRED EMBODIMENTS

Figure 1A:
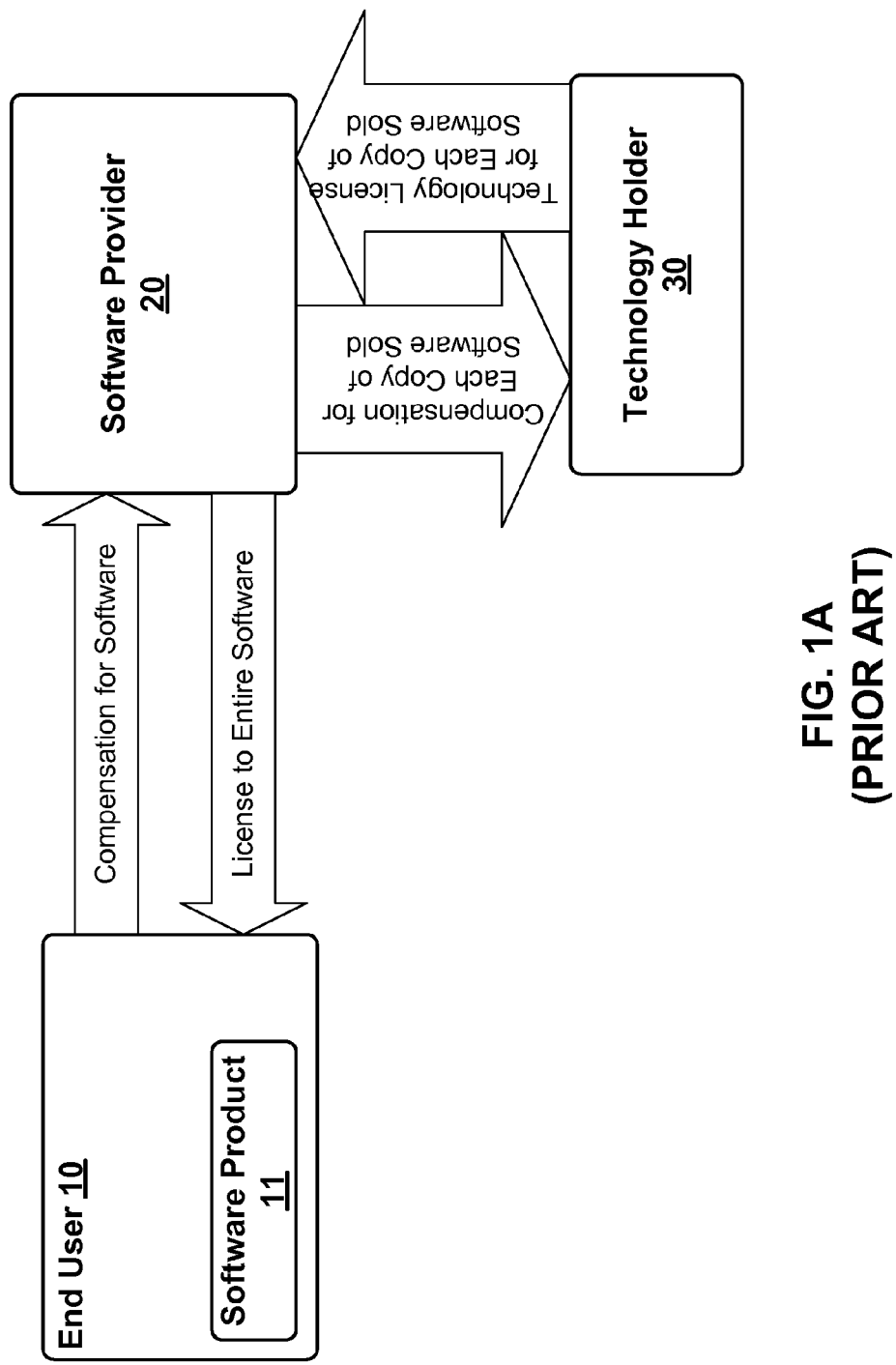
FIG. 1A is a diagram of a prior art software licensing system.
Figure 1B:
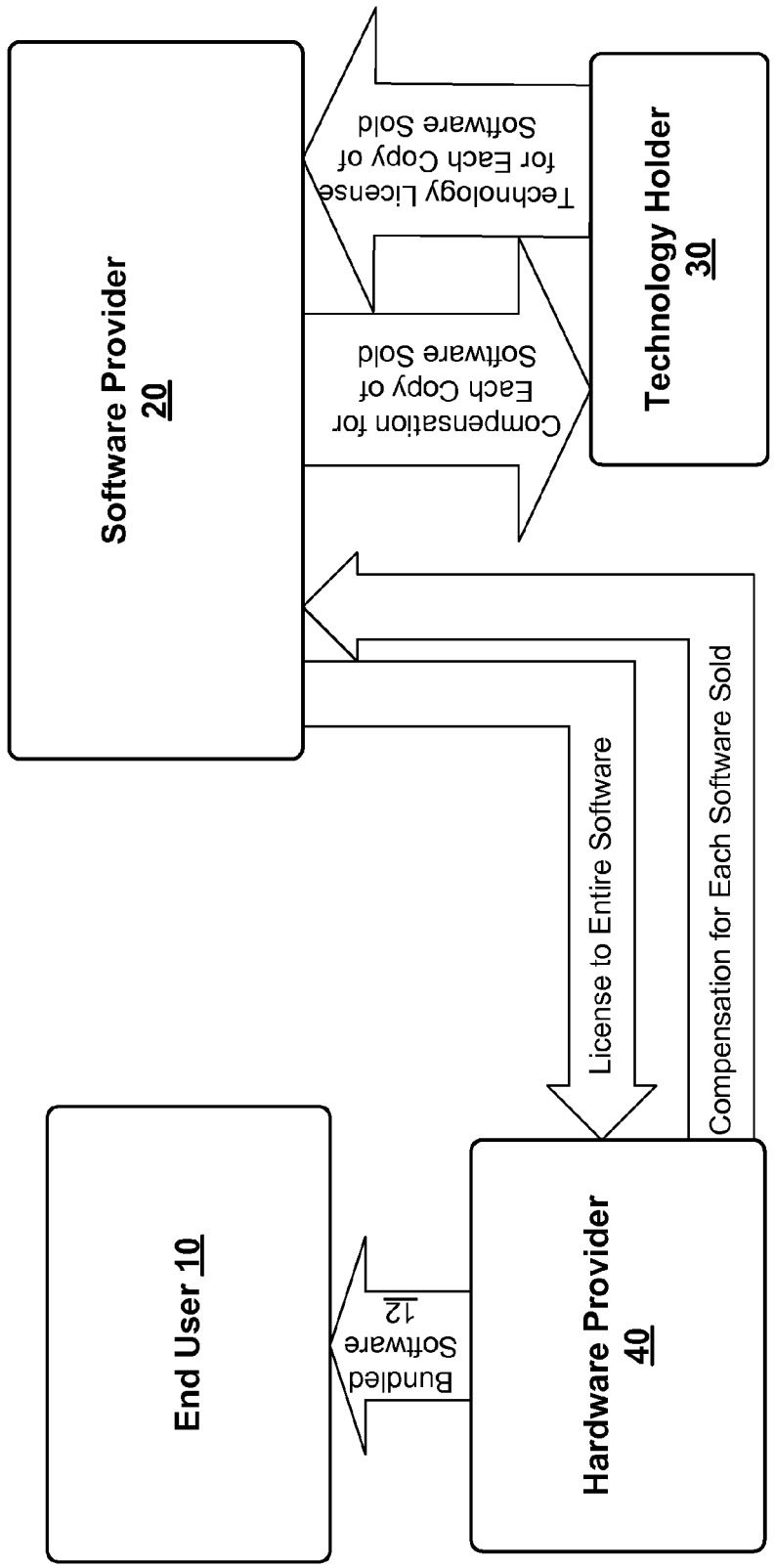
FIG. 1B is a diagram of another prior art licensing system for bundled software.
Figure 2A:
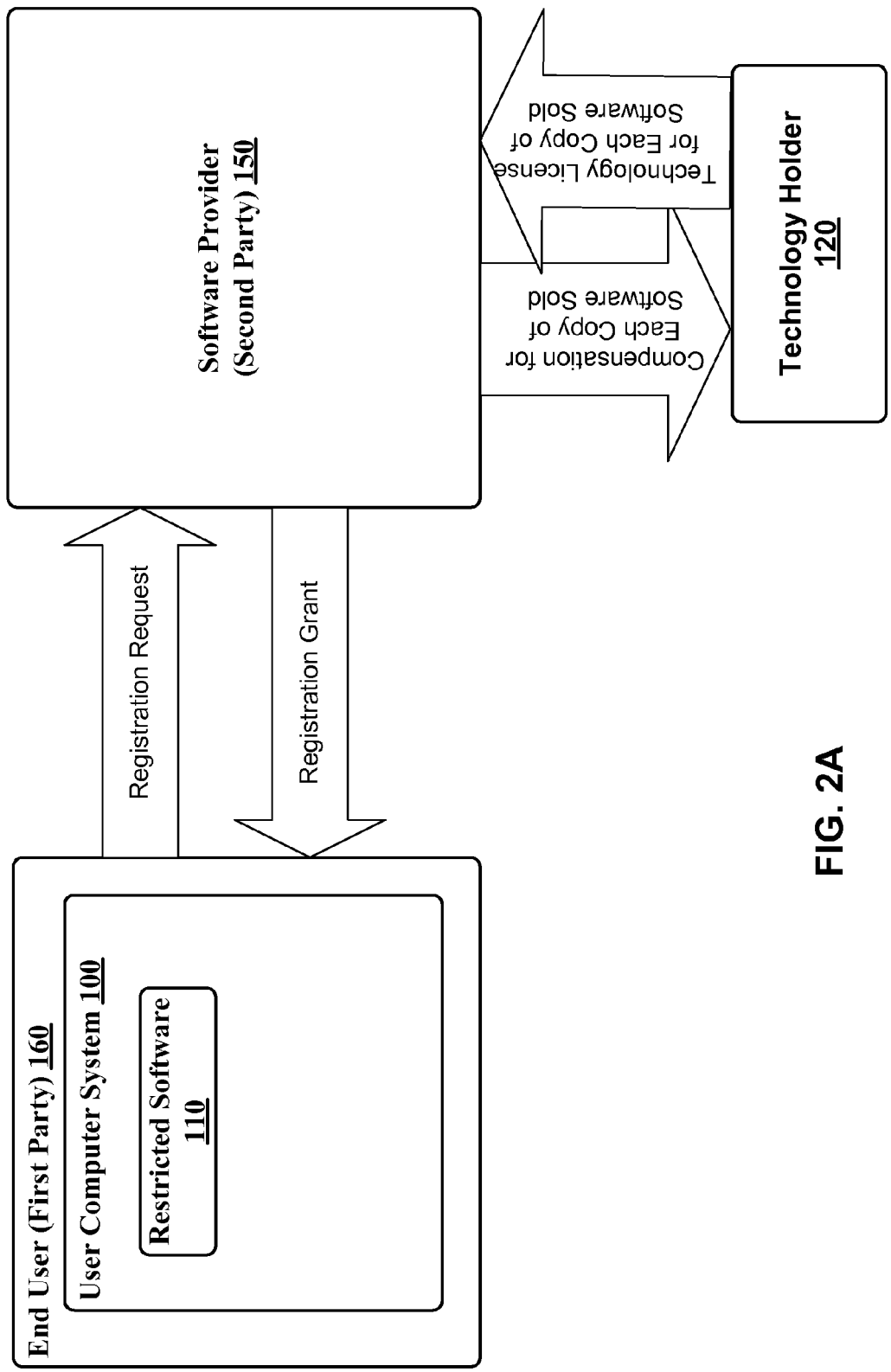
FIG. 2A is a diagram of one embodiment of a software licensing system in which a second party records first party registration information for licensed technology in a software product.

FIGS. 2A-2E depict an overview of several embodiments of the proposed efficient software licensing system. In accordance with the broader aspects of the system, FIG. 2A depicts a first embodiment of a software licensing system including a first party (typically an end user 160), a second party (typically the software provider 150), and a technology holder 120. In such a system, the second party 150 pays the technology holder 120 for a license associated with each copy of a software product 110 sold containing technology owned by the technology holder 120. The first party 160 acquires software product 110, which is fully licensed, but contains unregistered software functionality. Thus, neither the first party 160 or the second party 150 are required to provide further compensation to the technology holder 120 for the software functionality used. However, despite the functionality being licensed, certain software functionality is disabled until the first party 160 requests registration of the functionality with the second party 150. Upon receiving the registration request, the second party 150 records the registration and enables the newly registered software by delivering a relieving mechanism to the first party 160. The second party 150 may now use the registration information obtained from the first party 160 to determine which features of the software 110 are used more frequently. The second party 150 may then make decisions as to which technologies are included in future software releases.

Figure 2B:
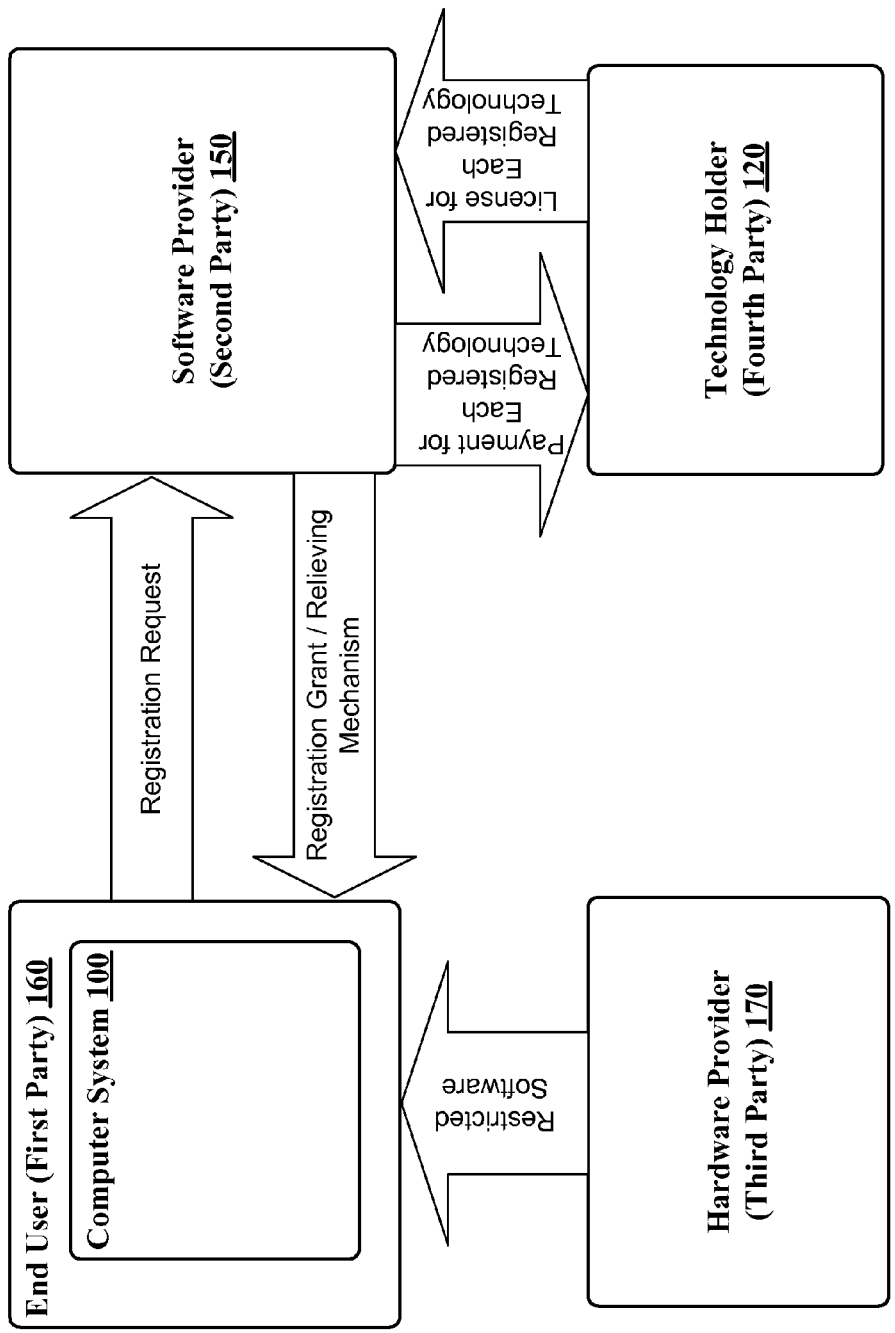
FIG. 2B is a diagram of one embodiment of a software licensing system in which a third party supplies bundled software to a first party, and a second party records the first party registration information in order to determine payment to a fourth party in exchange for a license to registered technology.

FIG. 2B depicts the broader aspects of a second embodiment in which a third party (typically a hardware provider 170) provides the first party 160 with bundled software containing functionality restrictions. The bundled software is produced by the second party 150, and the software incorporates technology requiring a license from a fourth party (typically a technology holder 120). The first party 160 requests registration of the unregistered functionality with the second party 150. Upon receiving the registration request, the second party 150 records the registration and enables the newly registered software by delivering a relieving mechanism to the first party 160. Finally, the second party 150 compensates the fourth party 120 for a license to the actual technology used by the first party 160. Compared to FIG. 2A, the system of FIG. 2B provides compensation to the fourth party 120 only when an end user 160 registers technology owned by the fourth party 120.

Figure 2C:
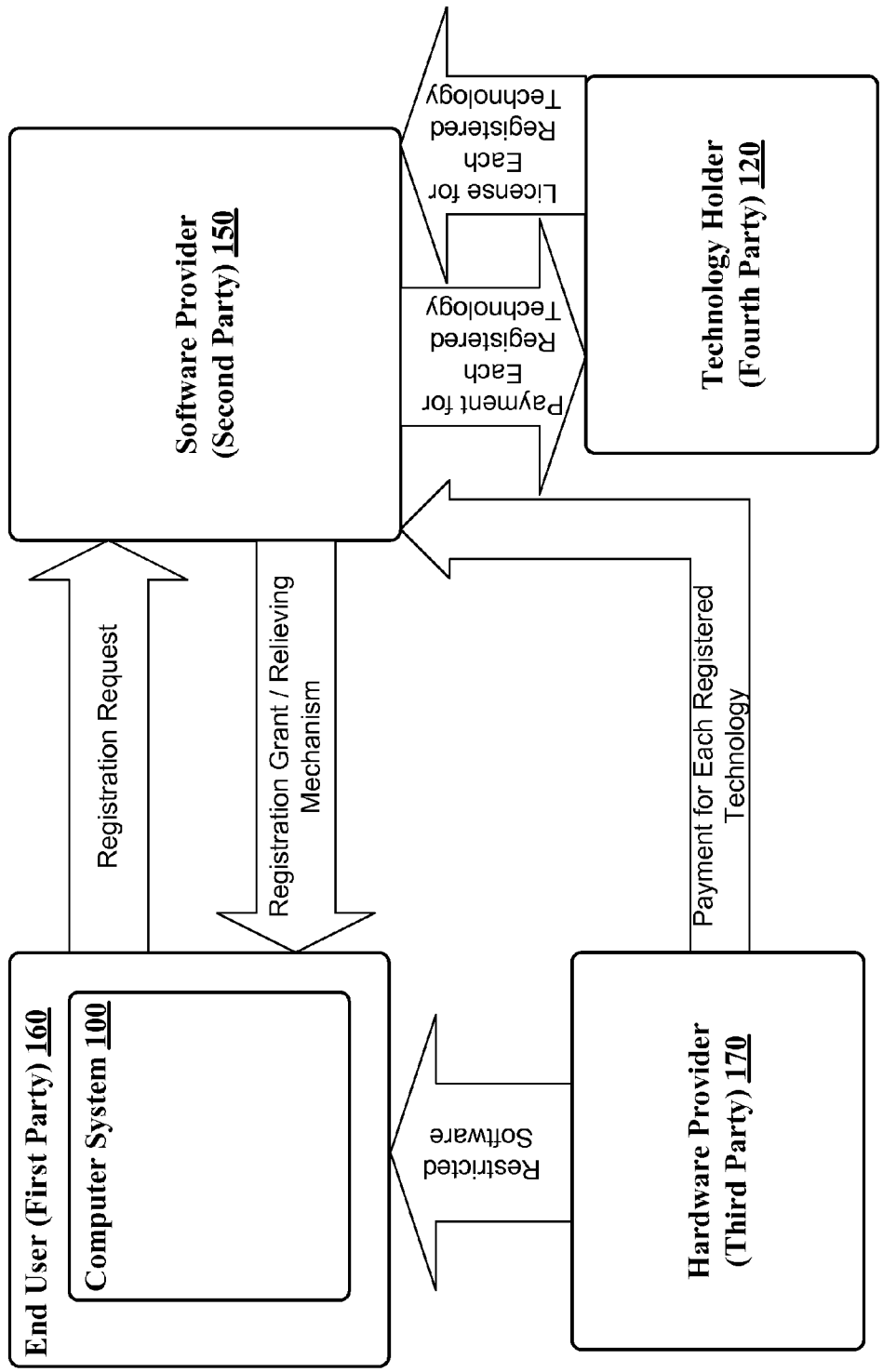
FIG. 2C is a diagram of one embodiment of a software licensing system in which a third party supplies bundled software to a first party, and a second party records the first party registration information in order to determine payment to a fourth party for a license to the registered technology.

FIG. 2C depicts the broader aspects of a third embodiment in which the third party 170 provides the first party 160 with bundled software 110 containing functionality restrictions. The bundled software 110 is produced by the second party 150, and the software 110 incorporates technology requiring a license from a fourth party 120. The first party 160 issues a request to register an unregistered function to the second party 150. Upon receiving the registration request, the second party 150 records the registration and enables the newly registered software by delivering a relieving mechanism to the first party 160. The second party 150 compensates the fourth party 120 for the actual technology used by the first party 160. Finally, the third party 170 compensates the second party 150 for the actual technology used by the first party 160.

Figure 2D:
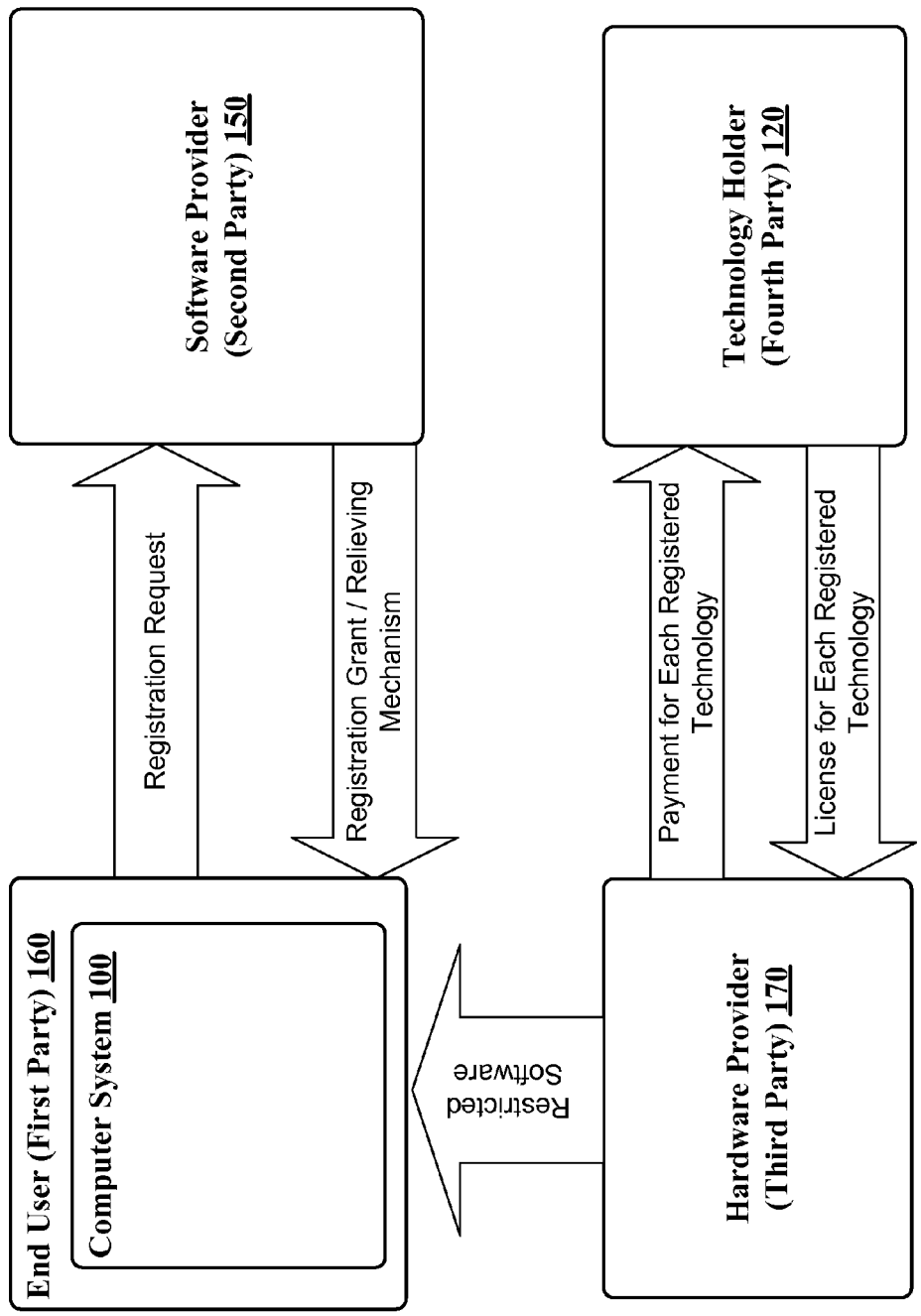
FIG. 2D is a diagram of one embodiment of a software licensing system in which a third party provides a payment to a fourth party based on registration information recorded by a second party.

FIG. 2D depicts the broader aspects of a fourth embodiment in which the third party 170 provides the first party 160 with bundled software 110 containing functionality restrictions. The bundled software 110 is produced by the second party 150, and the software 110 incorporates technology requiring a license from a fourth party 120. The first party 160 issues a request to register an unregistered function to the second party 150. Upon receiving the registration request, the second party 150 records the registration and enables the newly registered software by delivering a relieving mechanism to the first party 160. Finally, the third party 170 may compensate a fourth party 120 for the actual technology used by the first party 160. Accordingly, the fourth party 120 may deliver a license to the third party 170.

FIG. 2E depicts the broader aspects of a fifth embodiment in which the third party 170 provides the first party 160 with bundled software 110 containing functionality restrictions. The bundled software is produced by the second party 150, and the software incorporates technology requiring a license from a fourth party 120. The first party 160 issues a request to register an unregistered function to the third party 170. Upon receiving the registration request, the third party 170 records the registration and enables the newly registered software by delivering a relieving mechanism to the first party 160. Finally, the third party 170 compensates the fourth party 120 for the actual technology used by the first party 160. Accordingly, the fourth party 120 delivers a license to the third party 170.

It will be understood that there are many obvious variations of the above embodiments, and these variations are intended to be included within the scope and spirit of the broader aspects of the invention. The system is designed such that an intermediate party (e.g. the second or third party) between an end user and a technology holder pays the licensing fees to a technology holder based on the actual usage of the technology by an end user. Logistics of the system such as: which party delivers the software, which party tracks the registration, which party provides the relieving mechanism to the end user, and which party compensates the technology holder can be interchanged and still remain within the scope of the invention. This concept reflects an improvement from prior art systems which rely on the intermediate party to pay a technology holder for a full license for each copy of the software sold. Likewise, the system is distinguished from prior art systems which require the end user to pay a fee for additional functionality.

Figure 3:
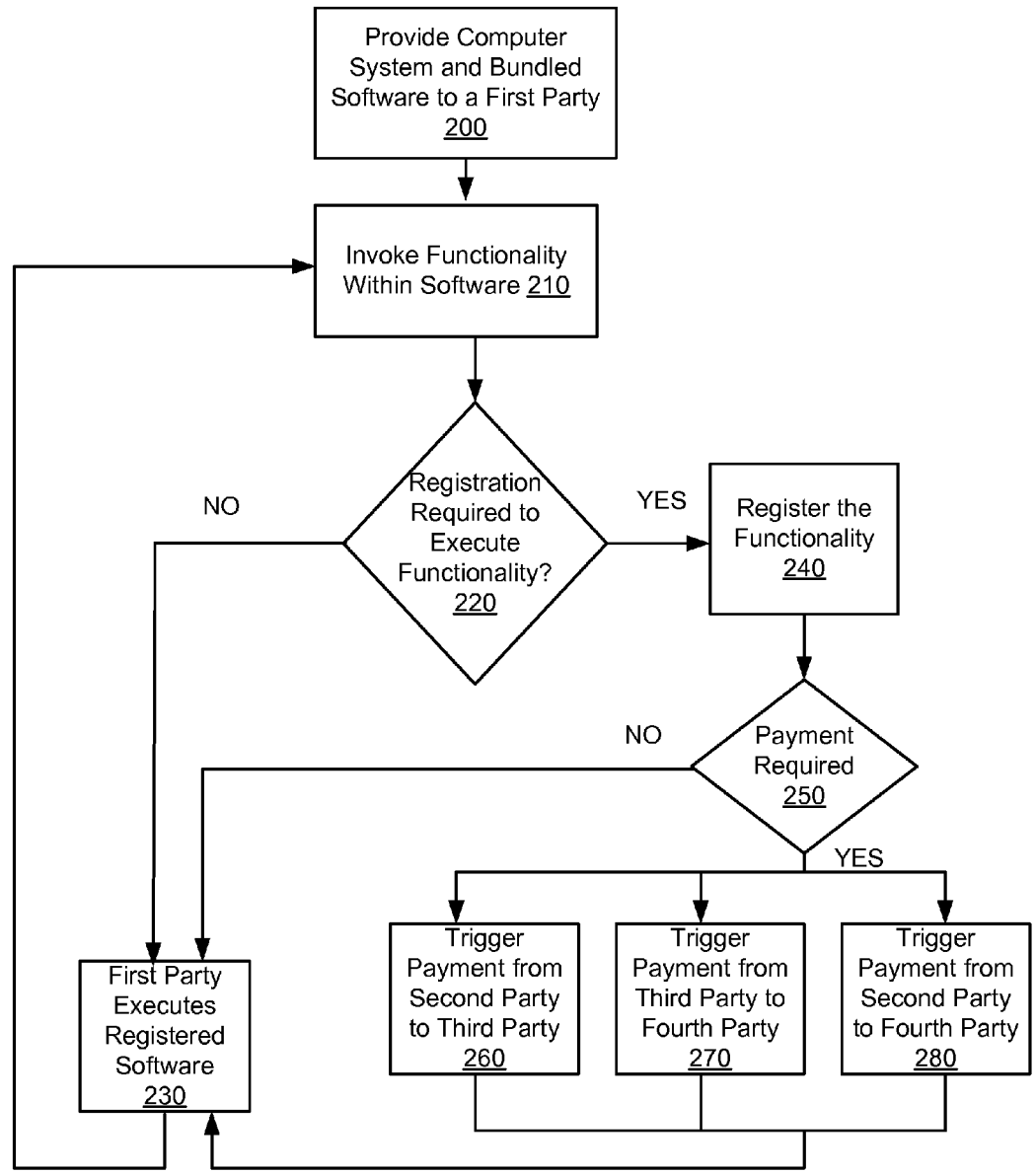
FIG. 3 is a flow diagram of the systems and methods of the software licensing system.

FIG. 3 describes the broader aspects of a method for implementing a system as shown in FIGS. 2A-2E. First, a protected software with restricted functionality is provided to a first party (step 200). The first party may, for example, be an end user who has received the software as bundled with a computer system. At step 210, the first party invokes software functionality within the protected software. The restricted functionality requires registration, such as functionality including the playback of DVDs using Dolby Digital decoding. Thus, at step 220 the software determines if registration is required to execute the functionality. If the functionality does not require registration (the "NO" condition), the user may execute the functionality without further action, as represented by step 230. If the functionality does require registration (the "YES" condition), the software is registered with a second or third party (step 240). The second or third party, for instance, may be the hardware provider or software provider. At step 250, the software determines if payment is required to license the newly registered functionality. If a payment is not required (the "NO" condition), as in the system of FIG. 2A, the first party may execute the newly registered software (step 230). If a payment is required (the "YES" condition), the registration triggers a payment to a fourth party from the second or third party (steps 270 and 280). For example, a hardware or software provider may pay a technology holder for the registered technology. Likewise, the registration may trigger a payment from a second party to a third party (step 260). For example, a hardware provider may compensate a software provider for the registered technology. One skilled in the art would appreciate that depending on the implementation, the payment may actually be made at a later time, even though the first party is authorized immediately to execute the software.

As a more specific example, referring back to FIG. 2B, the system allows a software provider 150 to license software provided with a computer system 100 or bundled with a computer peripheral for only the technologies required by a end user 160. For example, as a way to reduce wasted license fees, software for playing DVD media can be provided by the hardware provider to an end user 160 with limited functionality, specifically eliminating certain technologies that have associated licensing fees. The end user 160 can, through the Internet or some other electronic or physical mechanism, download or enable these technologies only when needed from the software provider 150. This can occur automatically when the end user 160 first attempts to play a commercial DVD, or on user request at any time prior to this.

When an end user 160 requests a necessary technology, he will identify himself as a unique and authorized recipient of this technology to the company that provides the technology activation service (in this proposal, the DVD software provider). There are several possible mechanisms for this, including the use of a serial number (provided with initial purchase) or some means of uniquely identifying the computer system 100, such as the Service Code on a Dell personal computer. Based on this identifying information, the appropriate technology is provided to the end user and the software provider 150 is charged for the technology license. Software provider 150 may then choose to recoup the license fees from the hardware producer, or alternatively, a hardware provider 170 may be required to pay license fees to a technology holder 170 based on the end user 160 registration of the software.

When the end user 160 is receiving or activating the required technology, there is an opportunity for the sale of additional products, and to capture the user information for future sales. The revenue from these additional transactions can be shared with the hardware provider to help offset costs. This also provides an opportunity to sell more advanced technologies from the technology holders, resulting in additional license fees.

Figure 4:
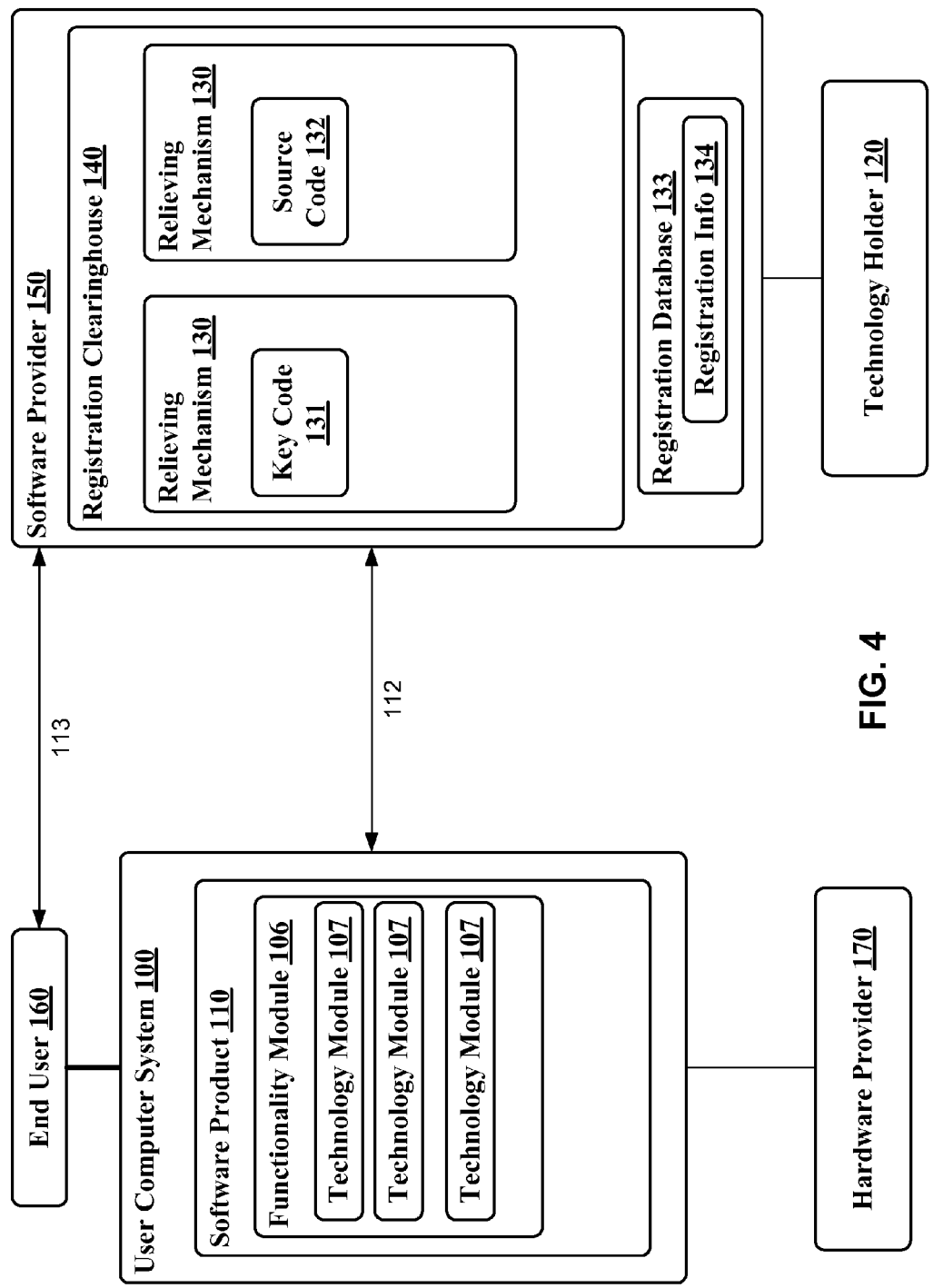
FIG. 4 is a diagram depicting an embodiment of the software licensing system.

Referring to FIG. 4, a more detailed diagram of the licensing system is depicted. Software product 110 may be executed within computer system 100. The computer system 100 may also include input devices such as mouse and keyboard (not shown) to provide the end user 160 with a means for interacting with the user interface of the computer system 100. The computer system may include a variety of storage devices such as an optical drive to read data information from optical discs such as those using CD or DVD technology. Software product 110 contains functionality module 106. Functionality module 106 represents a licensed or unlicensed software feature. For example, where software product 110 is software for playing DVD movies, the software may contain a functionality module that allows decoding the compressed video in a DVD movie, or playing a DVD movie with audio technologies such as Dolby Digital decoding, Dolby Surround decoding, DivX decoding, or DTS digital sound. While only one functionality module 106 is depicted, it is to be understood that more than one functionality module may exist in software product 110.

Each functionality module 106 may use one or more technology modules 107. Technology modules 107 represent intellectual property rights embodied within software product 110 that may be needed to execute a specified software functionality module 106. For example, a technology module 107 may incorporate the technology required to decode Dolby Digital audio. The technology modules 107 embodied within the functionality modules 106 are owned by technology holders 120. For example, Dolby Digital audio is owned by Dolby Laboratories. Thus, technology holder 120 may own patents, copyrights, or other protectible rights associated with technology modules 107.

Thus, software product 110 may contain functionality modules 106 that require securing additional licensing from one or more technology holders 120. These modules will be referred to as unlicensed technology modules 107. Software product 110 may also contain functionality modules 106 that do not require separate licenses beyond that required to use the basic software product 110. For instance, functionality modules 106 that allow playing a DVD without certain audio features or viewing the enhanced contents of the DVD are examples of functions that may not require separate technology licensing. A functionality module 106 may include several technology modules 107. Accordingly, while only one technology holder 120 is depicted in FIG. 4, it is to be understood that there may be several different technology holders 120 for one or more technology modules 107 in a software product 110.

Certain functionality modules 106 are protected, meaning that the functionality modules 106 are disabled or otherwise restricted, until all technology modules 107 needed to use the functionality module 106 are registered. For example, unlicensed technology modules 107 may be required to be registered by end user 160 in order to acquire a proper license and relieve the functionality restriction. To relieve the functionality restriction, a registration clearinghouse 140 is provided to supply software product 110 with the proper relieving mechanism 130. Once registered, software provider 150 may convert an unlicensed technology module 107 into a licensed technology module 107 by compensating a technology holder for the license. Technology modules 107 which are already licensed may also require a registration for the sole purpose of tracking their use.

Registration clearinghouse 140 acts as an interface between computer system 100 or end user 160, and technology holder 120. Registration clearinghouse 140 may be associated with software provider 150, as in FIG. 4, or may be a separate entity. Preferably, registration clearinghouse 140 and computer system 100 interface through communications network 112. Registration clearinghouse 140 receives registration requests from computer system 100, stores the registration information 134, and delivers a relieving mechanism 130 to computer system 100 to relieve the protection on a technology module 107. Registration clearinghouse 140 also serves the function of storing licensing information associated with the identification information in the registration database 133. Specifically, registration database 133 contains information used to track the use of technology modules 107. A software provider 150 may use this technology usage information in making decisions as to which technology products are used more frequently by end user 160. This technology usage information can then be used in making decisions as to which technologies should be included in future software releases. The software provider 150 may then elect to leave the less popular technology modules 107 out of future releases in an attempt to keep licensing costs to a minimum. Similarly, a software provider 150 may elect to remotely disable technology that a software provider 150 no longer wishes to license.

Relieving mechanism 130 may, for example, be a key code 131 that is automatically transmitted to the computer system 100 via communications network 112, a key code 131 given to end user 160 through telephone network 113, or missing source code 132 supplied to software product 110 to unprotect functionality module 106.

Figure 5:
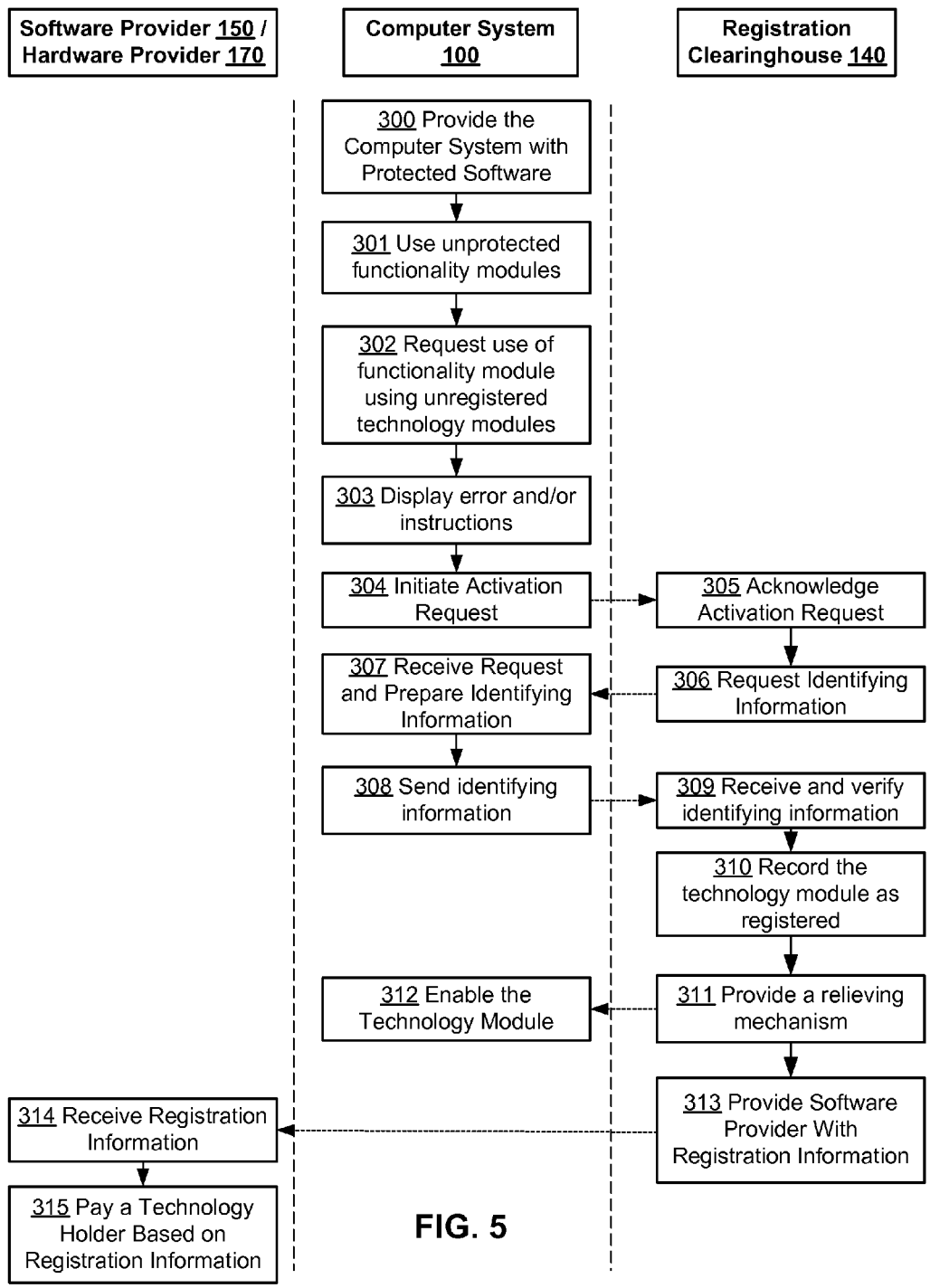
FIG. 5 is a flow diagram showing the steps for executing a software licensing system as described in the systems and methods of the present invention.

FIG. 5 depicts a preferred flow diagram for using the software licensing system described in FIG. 4. At step 300, computer system 100 is provided with protected software product 110. For example, in the instance where software product 110 is software used to play DVD movies, software product 110 may be bundled with a purchased DVD drive. In another embodiment, software product 110 is preinstalled on computer system 100. Alternatively, software product 110 may be supplied by physical delivery to end user 160 in the form of a CD-ROM, DVD, or other known portable storage medium. End user 160 may then install the software product 110 through an optical drive, or other known devices that have the capability of reading a portable storage medium within computer system 100. Alternatively, software product 110 may have been supplied to computer system 100 by any conventional delivery system known in the art such as downloading from a remote software repository over a communications network. For example, the communications network could be the Internet.

Once software product 110 is executed on computer system 100, at step 301 end user 160 may use any unprotected functionality modules 106 provided in the initial installation, as well as any functionality modules 106 that have all of its associated technology modules 107 already registered. For example, in the case of software used for DVD playback, end user 160 may play movies that do not require Dolby Digital decoding technology.

Prior to obtaining registering any technology modules 107, the functionality modules 106 may be protected to prevent the unauthorized use of technology modules 107. For example, a functionality module 106 that uses technology module 107 may be protected by: disallowing the execution of the functionality module 106, hiding the functionality from user interface of computer system 100, or by not including the necessary source code for the technology module 107 in software product 110.

At step 302 end user 160 requests the use of a functionality module 106 that uses at least one unlicensed technology module 107. As shown in step 303, when software product 110 disallows end user 160 from executing a functionality module 106 with an unregistered technology module 107, software product 110 may be configured to display an error screen within the user interface of computer system 100 to inform end user 160 that the functionality module 106 is protected. Furthermore, the error screen may instruct the end user 160 how to register the technology modules 107 to unprotect and gain the use of the functionality module 106.

Alternatively, software product 110 may not display any information within the user interface of computer system 100 to indicate that a functionality module is protected, but rather initiates an activation request 304 automatically, without notification to end user 160.

As shown in step 304, software product 110 initiates an activation request to registration clearinghouse 140. In step 305, registration clearinghouse 140 acknowledges the activation request. Next, in step 306, registration clearinghouse 140 requests identifying information for the technology module 107 to be registered. Preferably, the identification information should individually distinguish the particular end user 160 or the particular copy of software product 110 such that the information can be used to determine if a particular software product 110 has already been registered. For example, the identification information might consist of end user 160 identification, identification of the technology module 107, and a serial number for the software product 110 such as a CD key.

In response to the request for identification, as shown in step 307, software product 110 prepares the identifying information for transmission to registration clearinghouse 140. As shown by step 308, software product 110 transmits identifying information to registration clearinghouse 140. Next, at step 309, registration clearinghouse 140 verifies that the identifying information relates to at least one technology module 107 for which the registration clearinghouse is authorized to register.

In step 310, registration clearinghouse 140 records technology module 107 as registered in registration database 133. In the preferred embodiment, registration clearinghouse 140 will record a technology module 107 as "registered" after the first successful license is obtained. Thus, once the technology module 107 associated with a particular software product 110 has successfully been registered, registration clearinghouse 140 will no longer record subsequent registration requests in the registration database 133. For example, if end user 160 re-installs software product 110 the registration clearinghouse may provide the steps of registering the technology modules 107 as described above, but should not record an additional registration in the registration database 133. However, in other embodiments the number of successive installations may be recorded. Yet another embodiment may require registering technology modules 107 on a per-use basis to gather further usage information or to provide licensing on a per-use basis. For example, each time an end user 160 executes a functionality module 106, the registration procedure may include incrementing and recording a count in registration database 133 for use in determining ongoing licensing fees.

In step 311, registration clearinghouse 140 provides a relieving mechanism 130 to software product 110, thereby enabling the previously protected technology modules 107 associated with the relieving mechanism 130. Preferably, the relieving mechanism 130 is sent over communications network 112. However, the relieving mechanism 130 may be sent from registration clearinghouse 140 to computer system 100 using other well known methods. For example, the relieving mechanism 130 may have been supplied through an email message, telephone callback, postal service, or other any other known communication methods suitable for delivering the appropriate relieving mechanism 130.

As shown in step 312, the supplied relieving mechanism 130 is used to enable the technology module 107. For example, key code 131 is automatically entered into software product 110, or the missing source code 132 is automatically supplied to enable the technology module 107. If all technology modules 107 in a functionality module 106 are registered, the end user 160 may utilize the functionality module 106 immediately.

At step 314, software provider 150 may be provided with registration information 134 that can be used to determine which registered technologies 107 are used more frequently by end user 160. This registration information 134 may be sent to software provider 150 immediately upon registration, gathered and retrieved by the software provider as needed, or sent to the software provider on a periodic basis. The information may be sent via a communications network such as the Internet. However other methods of communicating the registration information 134, including via postal mail or via telephone is acceptable. Furthermore, it is anticipated that the registration information 134 may be provided to other interested parties besides software provider 150. For example, a technology holder 120 may also wish to account for the registered technology modules 107.

Registration clearinghouse 140 may also use the above registration steps as an opportunity for additional end user 160 interaction. For example, software products and services may be advertised, or additional user information may be collected for use in future sales opportunities.

While step 314 provides a software provider 150 with registration information 134 for use in tracking usage patterns of technology modules 107, the licensing system of FIG. 4 is additionally used to determine the licensing royalties to be paid for only the technology modules actually used by an end user 160. Specifically, software provider 150 may produce a software product 110 without initially providing payment for a license from a technology holder 120. Instead, software provider 150 uses the registration information 134 received in step 314 to determine the royalties to be paid to a technology holder 120. Thus, as shown in step 315, only after the registration of a technology module 107 by an end user 160, software provider 150 provides payment for the license to technology holder 120. It should be appreciated that payment may be made instantaneously, or billed on a periodic basis, through well known billing methods. It should also be appreciated that hardware provider 170 may also be required to submit a payment to technology holder 120 according to the collected registration information 134.

Thus, the methods of FIG. 5 describe a method of software licensing in which software provider 150 pays only for the technology modules 107 registered by end user 160. It should be appreciated that the method of licensing software reduces costs to software vendor 150 and end user 160 by not requiring the payment for unused technology in software product 110. Therefore, the discrepancy between the purchase cost by software provider 150 and the actual need of the end user 160 is eliminated. For end user 160, the money for the license is no longer wasted if the technology module 107 is not used. For the software provider 150, the license fees associated with unused technology modules will no longer reduce profit margins. Similarly, since unused technology 107 is not passed to the end user 160 in the selling price, the cost of the product is lowered, thereby increasing market share. Finally, the interaction between the registration database and the end user provides another opportunity to promote additional products by the software provider, technology holder, and/or manufacturer.

In another embodiment, activation and enabling steps 304-312 may be performed through a telephone interface 113 between registration clearinghouse 140 an end user 160. For example, in such an embodiment, at step 304, end user 160 places a telephone call to registration clearinghouse 140 to initiate the activation request for a technology module 107. Registration clearinghouse 140 may employ live personnel or make use of automated telephone systems which to carry out the functions of acknowledging the activation request 305, requesting the identifying information 306, receiving the identification information 309, recording the registration 310, and providing a relieving mechanism 130. User 160 can communicate the identification information, receive the relieving mechanism 130, and interact with computer 100 to enter the received relieving mechanism 130 to enable the technology module 107.

While the embodiments for completing the activation of a technology module 107 over communications network 112 and telephone network 113 are described in detail above, one skilled in the art would understand that any means of communicating the necessary activation requests, identification information, and relieving mechanisms 130 could be substituted with routine skill in the art. For example, it is anticipated that the activation and registration steps could be completed through postal mail as well.

In another embodiment, the software licensing system of FIG. 4 may be configured to temporarily activate the use of technology modules 107 even if computer system 100 is temporarily away from network 112 or end user 160 is unable to immediately register the product over phone network 113. This allows a functionality module 106 to operate for a limited time, even though the technology modules 107 are not properly registered. In this case, end user 160 may be given a predetermined period of time or number of uses of a technology module 107 before the functionality modules 106 requiring registered technology modules 107 are disabled. This embodiment is particularly useful for a user 160 that does not have access to telephone network 113 or communication network 112 for a short period of time. For example, a user 160 who wishes to watch a DVD movie using Dolby Digital sound may need the temporary use of the unlicensed technology modules 107 while on an airplane, where telephone network 113 or communications network 112 access is often inconvenient. Once user 160 has access to a telephone network 113, or the computer system 100 can access registration clearinghouse 140 through communications network 112, the technology modules are registered and relieved as described in steps 304-312 of FIG. 5.

Furthermore, software provider 150 may agree to license technology modules 107 from technology holder 120 on a per-use basis. Thus, the system may be designed to conform to royalty agreements based on multiple registrations for the same technology, for the same user. Thus, the licensing system may execute some combination of registration and enabling steps 304-312 each time a technology module 107 is used. In this embodiment, registration information 134 for each use is stored in the registration database 133 and billed to the software provider 150 using well known billing methods. Thus, the software licensing system may be configured to register technology modules 107 on both a per-use, or one-time use, basis.

Figure 6:
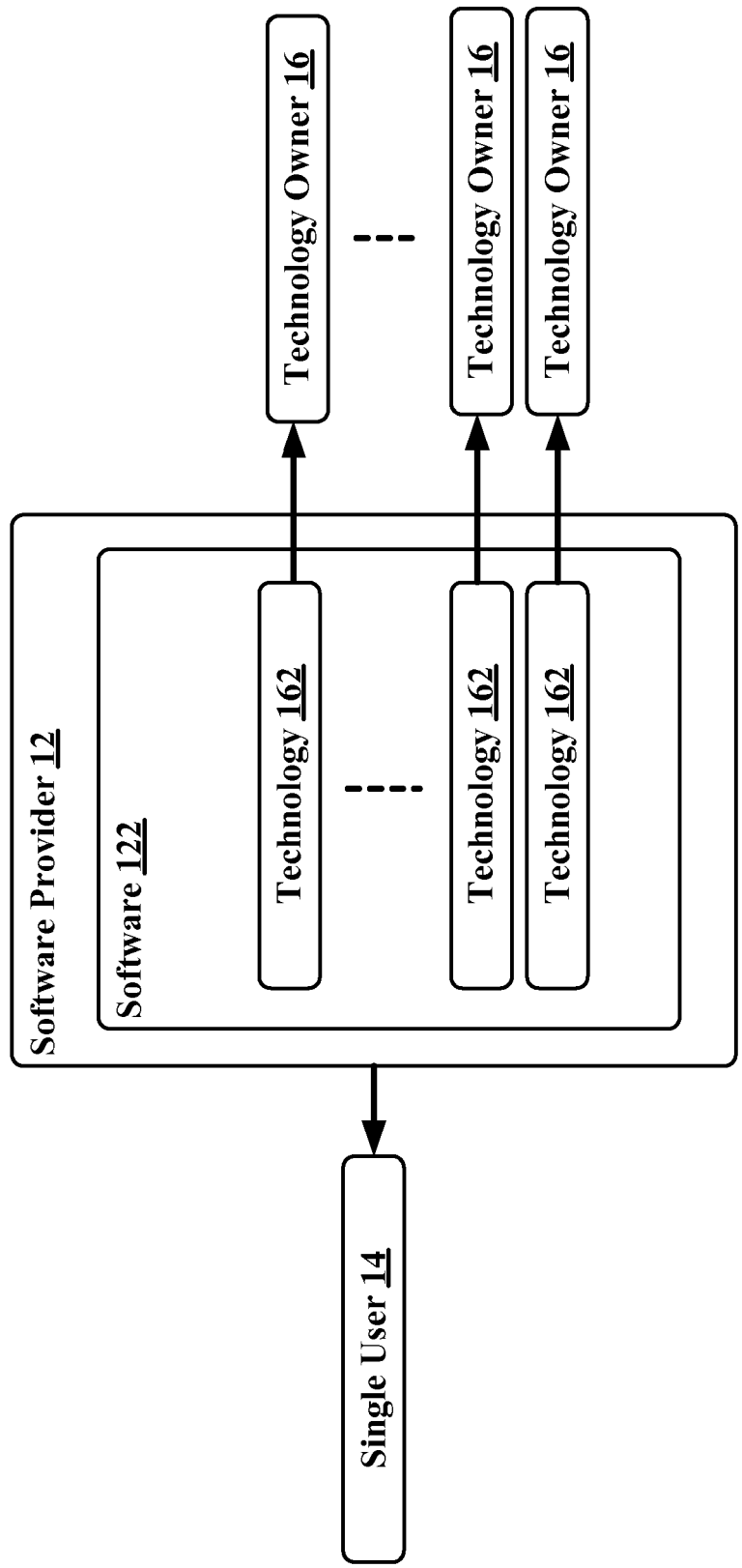
FIG. 6 depicts an overview of the three parties used in a prior art software trading system.

The present invention may also be described as a three-party software trading system and method. In a prior art system and method of a software trading system FIG. 6 illustrates a software provider 12 provides a software 122 to a single user 14. The software provider 12 pays a license fee for technologies 162 to all technology owners 16. The software provider 12 could be a software manufacturer, hardware manufacturer, or any party distributing the software 122 to a user 14. The user 14 may be any consumer or any party legally acquiring the right to use the software 122. The technology owner 16 can obtain a license fee from the software provider 12 based on the selling amount. The user 14 may not explicitly pay a license fee to the technology owner 16, but this license fee is generally included in selling price. Moreover, to protect software 122 from illegal duplication, the user 14 may be asked for a CD-key or service code associated with the software 122 if downloaded from Internet, bought from store, or sent through the mail. Neither the software provider 12 or the technology owner 16 are typically informed of an installation. Therefore, they do not know the actual number of installed copies of software 122. Also, more than one technology 162 may be associated with the software 122. Since a user 14 may never use certain features of the software 122, and the number of installations is not known, the actual usage of the licensed technologies 162 is not known.

The system of the first embodiment of the software trading system, is to be distinguished from the traditional trading system wherein the software provider pays a license fee to the technology owner for each unit shipped. Rather, in the present invention, the software provider can monitor which technology in software is less frequently used, thus providing the software provider with data to make product decisions based on which technologies are more frequently used.

Figure 7A:
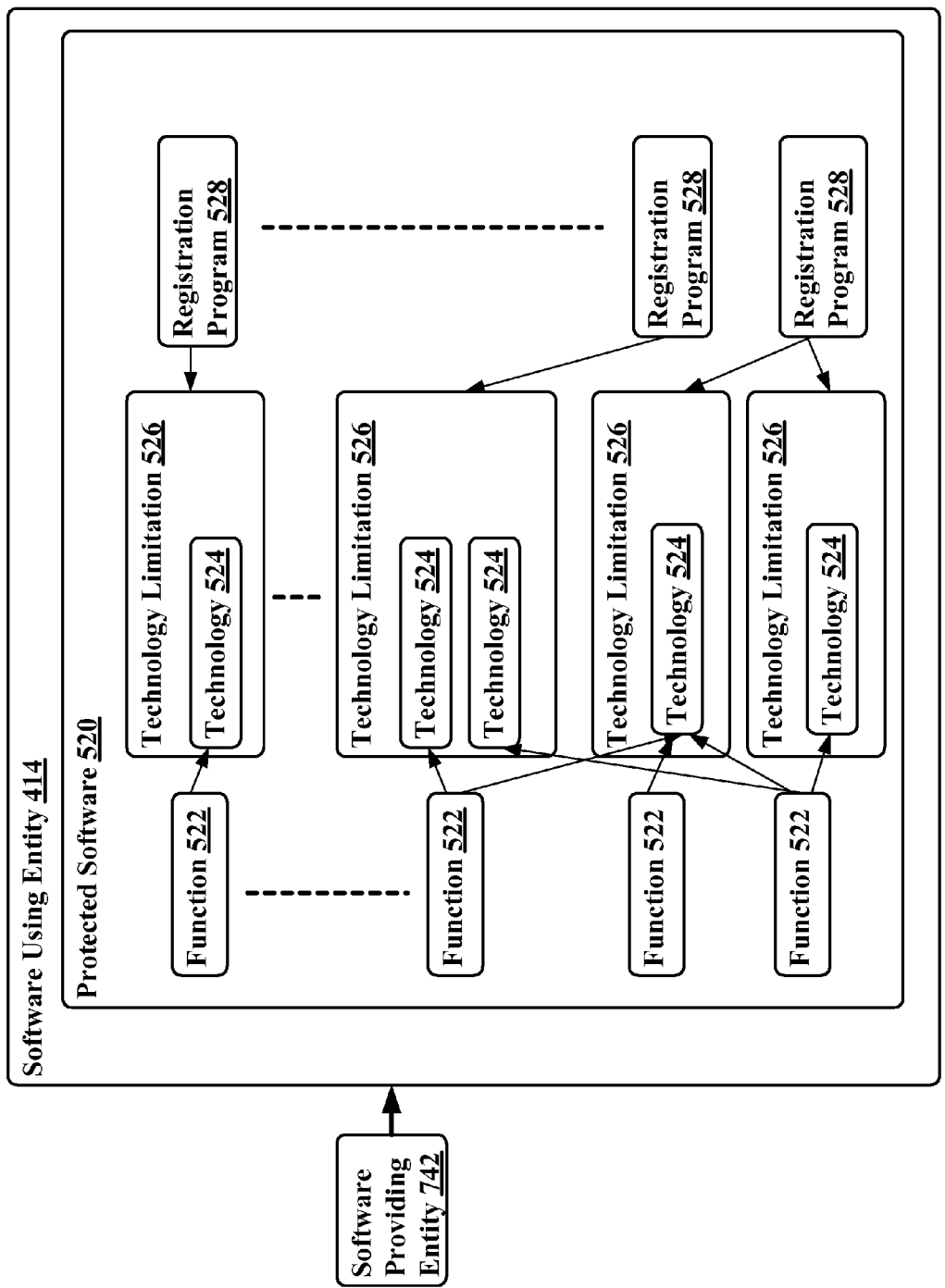
FIG. 7A shows a diagram of the protected software used in a software trading system.

Referring to FIG. 7A, in a first preferred embodiment of the software trading system, the protected software 520 of the current invention comprises one or more technology limitations 526, one or more functions 522, and registration programs 528. Each technology limitation 526 is used to limit the utilization of one or more technologies 524. Each function 522 uses one or more technologies 524, and each technology 524 is used by one or more functions 522. The technology limitation 526 associated with one technology 524 may prohibit the use of one or more functions 522. Each registration program 528 is used to relieve the limitation for technology limitation 526 associated with one or more technology 524. Each technology 524 corresponds to one registration program 528. Therefore, one registration program 528 is associated with one or more technology limitations 526, and is executed before the function 522 of the technology 524 associated with the technology limitation 526 is performed. Once the registration program 528 is successfully executed, the technology limitation 526 associated with the registration program 528 is relieved. When the technology limitation 526 associated with a technology 524 is relieved, the registration program 528 associated with the technology 524 is not performed again. For example, if one function 522 requires three technologies 524 and the three technologies 524 require two registration programs 528 to relieve the technology limitation 526 imposed thereon, the two registration programs 528 can relieve the technology limitation 526 for a total of six technologies 524. If the other three technologies 524 are required by another function 522, another function 522 can be automatically accessed once the two registration programs 528 had been executed.

Figure 7B:
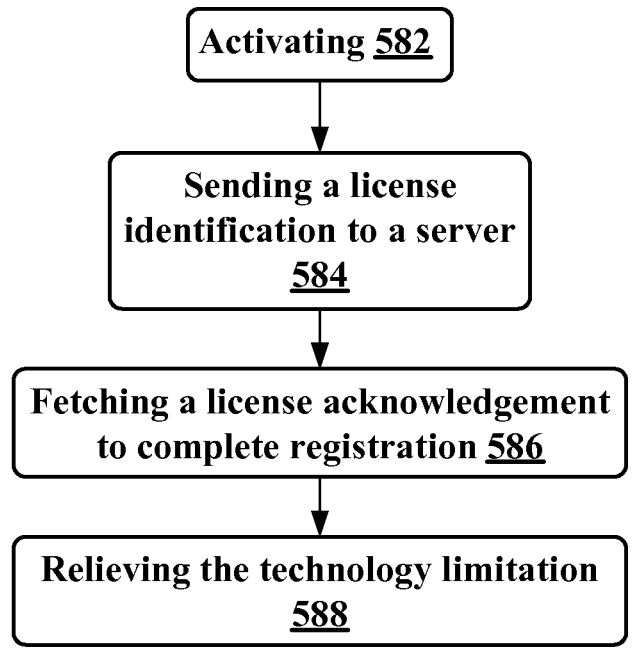
FIG. 7B is a flow diagram of a first preferred embodiment of a software trading system.

FIG. 7B illustrates the process steps used to execute the registration program 528. First, activating step 582 is executed. In the following identification step 584, a license identification is sent to a server. In the following acknowledge step 586, a license acknowledgment is obtained to complete registration. Finally, relieving step 588 is performed causing the technology limitation 526 to be relieved.

In the present invention, the activation step 582 may be performed by manually activating registration program 528, automatically activating the registration program when an associated function is executed, and manually and successively activating the registration programs 528 associated all involved technologies 524.

The license identification step 584 is used to justify the use of the protected software 520. To access pay technology 524 in a protected software 520, the software using entity 414 should send a license identification, which may be in the form of a string or electronic signal, and a document such as a CD key, serial number, or service code. The license identification may be manually input by software using entity 414, automatically checked by registration program 528, or shown by an identification document during software installation, after software installation when using pay technology.

The license acknowledgment step 586 is used to acknowledge whether the technology limitation 526 for the software 520 is relieved. The license acknowledgment may be obtained by automatically initiating a fetch of the acknowledgement from a server through a network, manually initiating the fetch of the acknowledgement from a server through a network, initiating a fetch after real mailing to a server, initiating a fetch after e-mailing to a server, or some other similar method. The registration is essentially finished after registration program 528 receives the license identification.

In above embodiment, the software 520 may be protected by failed function, hidden function, or the lack of necessary source code for a function 522 to operate. When software 520 is protected by failed function, certain functions 522 related to a specific technology 524 are failed until the technology limitation 526 is relieved by registration of the related technology 524. When software 520 is protected by hidden function, the function 522 is hidden from software using entity 414 until the completion of the registration of the related technology. When software 520 is protected by lack of necessary source code, source code required to operate a specific technology 524 is not contained in the software 520 such that one or more functions 522 cannot be executed due to the lack of necessary source code. The source code required to operate technology 524 is provided after the completion of the registration of the related technology. For example, the required source code can be provided by adding the missing source code or by replacing the entire source code for protected software 520.

Using the above embodiment, a software providing entity 742 may track which technologies 524 are registered by a particular user or copy of software. This is particularly suitable for video software such as DVD playback software, which may include many per-unit-licensing technologies that have high cost. For example, by tracking which technologies 524 are used by software using entity 414, a software providing entity 742 may determine which technologies to continue providing in future software 520 releases.

Figure 8:
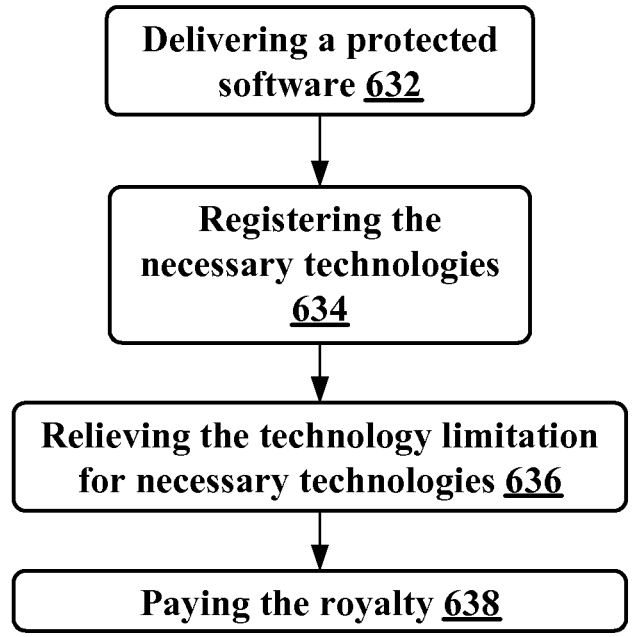
FIG. 8 is a flow diagram of a second preferred embodiment of the software trading system.

The second preferred embodiment of the software trading invention involves a three party trading method as described in FIG. 8. First, in step 632, a protected software 520 is delivered by a first party to a second party. As in the prior embodiment, the delivered software 520 contains one or more technology limitations 526 associated with technologies 524. Next, at registration step 634, the second party registers the necessary technologies 524 with one or more third parties. The third party records the registration information. Next, at relieving step 636, the second party requests a relieving mechanism associated with a particular technology from the third party. Further, the relieving mechanism is received and used to relieve a technology limitation 526. Finally, at paying step 638, the first party pays a license fee to the third party.

The protected software 520 in the second embodiment of the software trading system is the same protected software 520 as in the first embodiment. Thus the specific features of protected software 520 are the same as described above in the first embodiment. In this second embodiment, the second party using the software 520 (typically the software using entity 414) does not directly pay a license fee for the pay technology. Rather, the second party registers the pay technology with the third party (can be software provider or technology owner) according to practical need. Afterward, the first party (such as software provider) pays a license fee to the third party (can be a technology owner) according registration information regarding the technology 524 registered.

The registration information 762 includes first-time registration information and may include subsequent-time registration information. The first-time registration information is generated when the third party, for the first time, receives the license identification from the registration program 528 of the second party. The subsequent-time registration information is generated when the third party again receives the license identification from the registration program 528 of the second party. For example, it is possible that the software using entity 414 may reinstall the software and the third party again receives the license identification from the registration program 528 of the second party. The technology 524 may only require payment for the first-time registration. The third party may be paid by the first party or the licensee of the first party. Furthermore, the payment may be made directly or indirectly to the third party. Moreover, the third party may provide an interactive mechanism to the second party at the same time as, or after, the technology 524 is relieved by a second party. For example, the interactive mechanism may include custom services, advertisements, promotions, or special charges.

Compared with the prior art based on one-time and full payment for license fee, the embodiment described above can prevent wasted money by registering, and paying for, only the licenses actually used.

Figure 9:
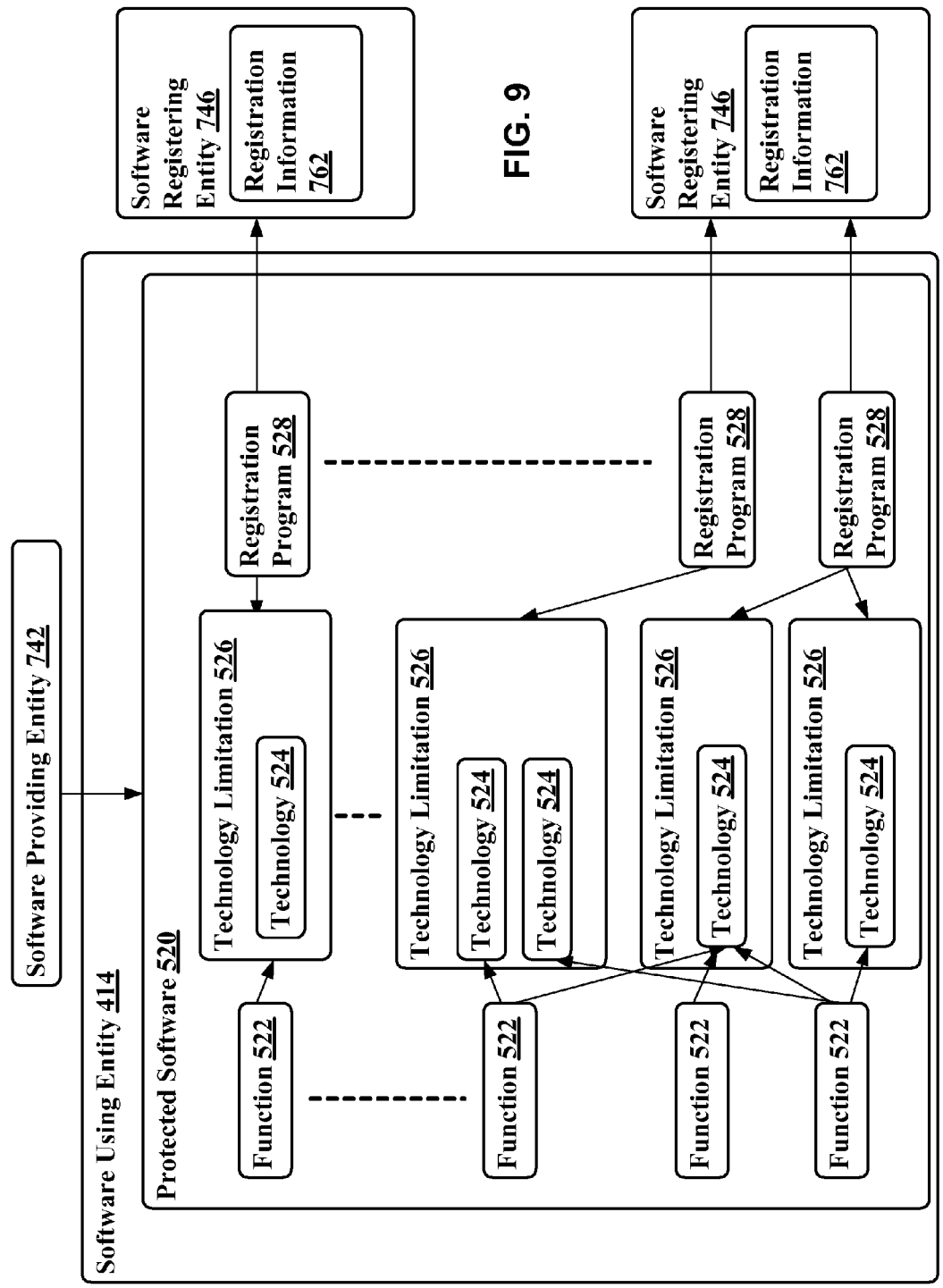
FIG. 9 depicts a third embodiment of the software trading system.

FIG. 9 shows a third embodiment of a three-party trading system. The three-parties comprise a software providing entity 742, a software using entity 414, and one or more software registering entities 746. The software providing entity 742 provides protected software 520 to the software using entity 414. The protected software 520 comprises one or more functions 522, one or more technologies 524, one or more technology limitations 526, and one or more registration programs 528. Each technology limitation 526 is used to limit the utilization of one or more technologies 524. Each function 522 uses one or more technologies 524, and each technology 524 is used by one or more functions 522. Each registration program 528 is used to relieve a technology limitation 526 associated with one or more technologies 524. Each software registering entity 746 is provided with registration information 762 provided by registration program 528. Each registration entity 746 records the registration information 762 after the registration of a technology 524.

The protected software 520 in the third embodiment of the software trading system is the same protected software 520 as in the first and second embodiment. The software 520 can be delivered to the software using entity 414 from the software providing entity 742 by any mechanism such as network downloading, bundled sales, physical delivery, or other known software delivery methods. The software providing entity 742 controls payment for the software using entity 414. It should be understood by one skilled in the art that method of payment is not limited. The software registering entity 746 controls the registration process and the process of relieving a technology limitation for the software using entity 414. The software registering entity 746 can be accessed by the software using entity 414 through a communications network, telephone, mail, voice communications, letter, electronic signature, remote download, storage media delivery, or other known methods.

The registration information 762 stored by the software registering entity 746 may include first-time registration information 762 and subsequent-time registration information 762. Multiple registrations for the same technology, from the same software using entity 414, may be charged once or repeatedly charged. The first-time registration information 762 is generated when the software registering entity 746 receives a license identification from the registration program 528 of the software using entity 414 for the first time. Subsequent-time registration information 762, for example, is generated when the software registering entity 746 again receives the license identification from the registration program 528 of the software using entity 414. For example, it is possible that the software using entity 414 may reinstall the software and the software registering entity 746 again receives the license identification from the registration program 528 of the software using entity 414. The technology 524 may only require payment for the first-time registration. The software registering entity 746 may be paid by the software providing entity 742 or a licensee of the software providing entity 742. Furthermore, the payment may be transferred directly or indirectly to the software registering entity 746. Moreover, the software registering entity 746 may provide an interactive mechanism to the second party at the same time as, or after, the technology 524 is relieved by the software registering entity 746. For example, the interactive mechanism may include custom services, advertisements, promotions, or special charges.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method associated with the execution of software on a computer system comprising:
   requesting the execution of a software routine in the software, the request initiated by a first party comprising an end user;
   determining by the software whether execution of the software routine requires a payment to a third party without user interaction, the third party comprising a technology provider; and
   dispatching a notification to a second party comprising a software provider, the notification indicating that the software routine has been invoked by the first party, wherein the notification is a record sent to the second party indicating that the third party requires the payment from the second party for the execution of the software routine,
   wherein the second party pays licensing fees to the third party only for actual execution of the software routine by the client user, and
   wherein the licensing fee paid for the actual execution of the software routine is paid on a function-by-function basis.

2. The method of claim 1, further including the step of:
   restricting usage of the software routine until the notification has been sent to a second party.

3. A method associated with the execution of software on a computer system comprising a plurality of functions, wherein each function corresponds to a different technology owned by a corresponding technology holder, the method comprising:
   receiving a request to execute at least one of the functions corresponding to different technologies in the software, the request being initiated by a client user;
   determining by the software whether the execution of the software routine requires a payment to a corresponding technology holder without user interaction; and
   dispatching a notification to a software provider indicating that the at least one function has been executed by the client device, wherein the notification is sent to the software provider to trigger payment by the software provider to the corresponding technology holder for the execution of the at least one of the functions,
   wherein the software provider pays licensing fees to the technology holder only for actual execution of the software routine by the client user, and
   wherein the licensing fee paid for the actual execution of the software routine is paid on a function-by-function basis.

4. The method of claim 3, wherein the software provider sends payment to the technology holder only according to actual usage of functions in the software by the client user.

5. The method of claim 3, wherein the software is fully licensed.

6. The method of claim 3, wherein each of the plurality of functions is initially unregistered when the software is received by the client user.

7. The method of claim 6, wherein a function is registered upon being executed by the client device.

* * * * *